(12) United States Patent
Munroe et al.

(10) Patent No.: US 7,870,883 B2
(45) Date of Patent: *Jan. 18, 2011

(54) METHOD OF MANUFACTURE OF AN ENERGY ABSORBING TIRE CAGE

(75) Inventors: Scott Troy Munroe, Subiaco (AU); Donald Kent Wilson, Thunder Bay (CA)

(73) Assignee: Goldcorp Canada Ltd., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/342,010

(22) Filed: Dec. 22, 2008

(65) Prior Publication Data

US 2009/0172937 A1    Jul. 9, 2009

Related U.S. Application Data

(60) Continuation of application No. 11/695,962, filed on Apr. 3, 2007, now Pat. No. 7,530,383, which is a division of application No. 10/971,819, filed on Oct. 21, 2004, now Pat. No. 7,240,713.

(51) Int. Cl.
*B60C 25/00* (2006.01)
(52) U.S. Cl. .......................................... 157/1
(58) Field of Classification Search ................ 157/1, 157/1.1
See application file for complete search history.

(56) References Cited

U.S. PATENT DOCUMENTS

| | | | |
|---|---|---|---|
| 2,407,049 A | 9/1946 | Winarsky et al. | |
| 2,784,776 A | 3/1957 | Wentzien et al. | |
| 2,792,056 A | 5/1957 | Ricketts | |
| 3,495,647 A | 2/1970 | Branick | |
| 3,621,247 A | 11/1971 | Lide | |
| 3,687,442 A | 8/1972 | Goff | |
| 3,809,900 A | 5/1974 | Steffel | |
| 3,817,299 A | 6/1974 | Koehler | |
| 4,032,785 A | 6/1977 | Green et al. | |
| 4,036,274 A | 7/1977 | Peel, Sr. | |

(Continued)

FOREIGN PATENT DOCUMENTS

AU    1838392    1/1993

(Continued)

OTHER PUBLICATIONS

"Artiglio Master Operator's Manual"; Corchi; Nov. 2001; 52 pp.

(Continued)

*Primary Examiner*—Hadi Shakeri
(74) *Attorney, Agent, or Firm*—Sheridan Ross P.C.; Dennis J. Dupray

(57) ABSTRACT

A tire cage is disclosed for containing the debris from a tire explosion. The cage includes a lightweight energy absorbing material for protecting structural members of the cage from tire explosion damage so that the cage is reusable. The energy absorbing material may be a metallic foam or other open celled structured material that is able to absorb large amounts of kinetic energy by permanently deforming. The cage is particularly effective in containing explosions of large equipment tires 6 to 12 feet in diameter and having a stored kinetic energy in a range of approximately 900 kilojoules to 1500 kilojoules.

26 Claims, 12 Drawing Sheets

U.S. PATENT DOCUMENTS

| | | | |
|---|---|---|---|
| 4,057,093 | A | 11/1977 | Joines |
| 4,381,027 | A | 4/1983 | Molen et al. |
| 4,389,947 | A | 6/1983 | King et al. |
| 4,479,522 | A | 10/1984 | Lapham |
| 4,529,019 | A | 7/1985 | Blevins et al. |
| 4,538,659 | A | 9/1985 | Adelman et al. |
| 4,609,025 | A | 9/1986 | Messenger |
| 4,742,859 | A | 5/1988 | Mannen |
| 4,809,759 | A | 3/1989 | Dale et al. |
| 4,811,774 | A | 3/1989 | Dale et al. |
| 4,840,215 | A | 6/1989 | Vijay et al. |
| 4,865,104 | A | 9/1989 | Mannen |
| 4,893,569 | A | 1/1990 | Hansen |
| 5,057,169 | A | 10/1991 | Adelman |
| 5,449,031 | A | 9/1995 | Burklund |
| 6,062,632 | A | 5/2000 | Brachos et al. |
| 6,112,931 | A | 9/2000 | Booth et al. |
| 6,155,323 | A | 12/2000 | Gougelet |
| 6,435,805 | B1 | 8/2002 | Smith |
| 6,740,381 | B2 | 5/2004 | Day et al. |
| 6,923,200 | B2 | 8/2005 | Gonzaga |
| 2004/0212795 | A1 | 10/2004 | Steinbichler et al. |
| 2005/0074593 | A1 | 4/2005 | Day et al. |
| 2005/0082013 | A1 | 4/2005 | White |
| 2006/0086465 | A1 | 4/2006 | Munroe et al. |
| 2007/0113760 | A1 | 5/2007 | Munroe et al. |
| 2007/0175592 | A1 | 8/2007 | Munroe et al. |
| 2007/0213419 | A1 | 9/2007 | Cao et al. |

FOREIGN PATENT DOCUMENTS

| | | |
|---|---|---|
| EP | 0639150 | 2/1995 |
| EP | 0883779 | 12/1998 |
| EP | 0985559 | 3/2000 |
| NZ | 247775 | 1/1995 |
| WO | WO 93/22223 | 11/1993 |
| WO | WO 95/29071 | 11/1995 |
| WO | WO 97/24558 | 7/1997 |

OTHER PUBLICATIONS

"Jolly Operator's Manual"; Corchi; Jan. 2000; 48 pp.

"The Right Equipment for a Heavy-Duty Business"; AMMCO and COATS; (date unknown); 6 pp.

Photo: EDMO Tyre Press, 1 page.

Webpage: "EDMO Equipment"; Tyre (Tire) Presses; (date unknown); 3 pp.

Webpage: "EDMO 250 Ton Tire Press"; Dovebid; Nov. 7, 2003; 1 p.; http://www.dovebid.com/assets/display.asp?ItemID=web1819510.

Webpage: "Welcome to EDMO Equipment: Introduction to the EDMOTM Equipment Company"; (date unknown); 2 pp.

Zhu et al., "Analysis of the elastic properties of open-cell foams with tetrakaidecahedral cells,"J. Mech. Phys. Solids. 45, 319-343 (1997).

Gibson, "Mechanical behavior of metallic foams, "Annu. Rev. Mater. Sci. 30, 191-227 (2000).

Newland et al., "Could the World Trade Center have been modified to prevent its collapse?", Draft Oct. 21, 2001, pp. 1-9.

PCT International Search Report and Written Opinion of the International Searching Authority for counterpart International Application No. PCT/CA2005/001616, dated Jan. 30, 2006, 11 pages.

International Preliminary Report on Patentability for International (PCT) Patent Application No. PCT/CA2005/001616, mailed May 3, 2007.

Official Action for U.S. Appl. No. 11/695,962, mailed Dec. 6, 2007.

Official Action for U.S. Appl. No. 11/695,962, mailed May 27, 2008.

Notice of Allowance for U.S. Appl. No. 11/695,962, mailed May 27, 2008.

Gupta, "Characterization of Syntactic Foams and Their Sandwich Composites: Modeling and Experimental Approaches", A Dissertation Submitted to the Graduate Faculty of the Louisiana State University, Aug. 2003, pp. 1-90.

Hutcheson et al. "Optimizing Sandwich Panel Performance With 3-D Fiber Reinforced Core Architecture", 2003, pp. 1-9.

Stoll et al. "High-Performance, Low-Cost Infusion Cores For Structural Sandwich Panels", From Proceedings of SAMPE 2004, May 16-20, 2004, Long Beach Convention Center, Long Beach, Calif., pp. 1-11.

Official Action for Canadian Patent Application No. 2,583,674, mailed May 13, 2009.

Official Action for Australian Patent Application No. 2005297371, dated Aug. 18, 2010.

Official Action for U.S. Appl. No. 11/627,813, mailed Oct. 15, 2010.

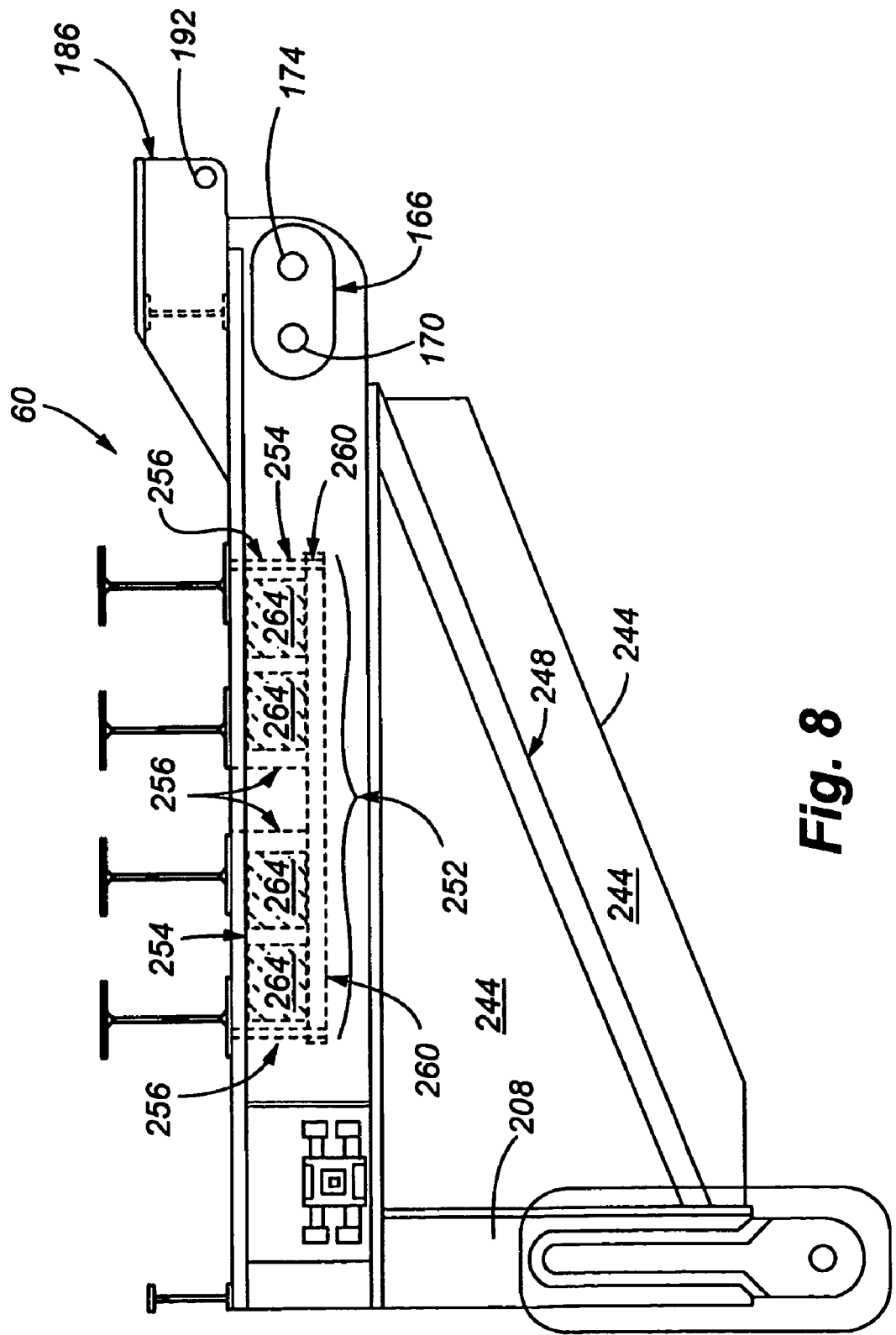

METHOD OF MANUFACTURE OF AN ENERGY ABSORBING TIRE CAGE

RELATED APPLICATION

The present application is a continuation of U.S. patent application Ser. No. 11/695,962, filed Apr. 3, 2007, entitled "METHOD OF MANUFACTURE OF AN ENERGY ABSORBING TIRE CAGE", which is a divisional of U.S. patent application Ser. No. 10/971,819, filed Oct. 21, 2004, now U.S. Pat. No. 7,240,713 entitled "ENERGY ABSORBING TIRE CAGE AND METHOD OF USE", each of the above-identified applications fully incorporated by reference herein.

RELATED FIELD OF THE INVENTION

The present invention relates to a cage tire for containing tire explosions, and in particular, to tire cages for containing tire explosions of having a diameter in the range of 6 to 12 feet, and having stored energy, e.g., in a range of 500 kilojoules to 7500 kilojoules which is approximately 13-200 times the energy of a conventional truck/SUV tire.

BACKGROUND

It is well known that inflation or deflation of certain tires can be hazardous to personnel performing such operations and to others nearby. In particular, split rim tires are known to be especially dangerous in that metal portions of the split rim can be propelled at high velocity if the tire fails. Moreover, such tire failures where portions of the split rim may become projectiles is especially dangerous when inflating or deflating such tires. This is true of virtually all split rim tires, and there have been various devices developed to hold or secure split rim tires for light vehicles (e.g., cars or trunks). However, for inflation or deflation of very large tires such as those on heavy/industrial mobile equipment (e.g., loaders, graders, large earth moving equipment), there heretofore has not been any equipment developed or proposed for containing the extreme explosiveness and potential destructiveness of such very large tires that are, e.g., 8 to 10 feet (or more) in diameter. Said another way, size does indeed matter when it comes to the dangerousness and destructiveness of a large tire explosion. In particular, all known prior art apparatuses for containing such large tire explosions are immobile and exceedingly large.

Accordingly, it would be desirable to have a mobile tire cage that is relatively lightweight and is able to effectively contain the explosion of a large tire. Moreover, it would be desirable that such cage be reusable.

SUMMARY

The present invention is a tire cage for containing debris from a tire explosion that can occur during, e.g., the inflation or deflation of a tire. In particular, the tire cage of the present invention is designed to contain all portions of a split rim that could otherwise cause harm and/or damage if propelled unimpeded from a tire explosion. More particularly, embodiments of the tire cage of the present invention are suited for containing debris from large tires such as those used on earth moving vehicles, such tires being, e.g., 6 to 12 feet in diameter. Additionally, embodiments of the tire cage are reusable in that the structural members of the tire cage are protected from a sufficient amount of the effects of tire explosion sudden impact such that such structural members are not damaged. Such protection is accomplished by converting tire explosion impact energy into plastic deformation energy, thereby keeping the peak force exerted on the structural members of the cage below the level that causes damage. That is, the tire cage includes replaceable, kinetic energy absorbing materials that can absorb, without damaging the structural members of the cage (e.g., frame beams and steel plates), a tire explosion impact force of, depending on the cage embodiment, a tire 6 to 12 feet in diameter. In particular, an embodiment of the tire cage for an tire 8 feet in diameter is intended to absorb a tire explosion of 3500 to 3700 kiloNewtons, and absorb approximately 900 kilojoules to 1500 kilojoules, and more preferably 1160 kilojoules (855,853 ft-lbs) of kinetic energy from, e.g., a flange and bead seat band of a split rim tire propelled toward such structural members of the tire cage.

It is an important aspect of the tire cage of the present invention that embodiments for receiving large tires are relatively lightweight and easily transported to where such large tires are in use. This is especially important in view of the fact that energy stored within tires increases exponentially with the size of the tire (e.g., a typical truck tire of 3 foot diameter may store approximately 60 kilojoules of energy, a typical inflated 6 foot diameter tire may store approximately 500 kilojoules of energy, a typical inflated 8 foot diameter tire may store approximately 1200 kilojoules, and a typical inflated 12 foot diameter tire may store approximately 7500 kilojoules). Thus, even for 8 to 12 foot diameter tires, embodiments of the present invention may be:

(a) Less than approximately ten tons (and more preferably between seven and ten tons or less), and (b) Not substantially larger than the tires provided therein (e.g., occupying a volume of less than approximately five times the size of a tire received therein). That is, the outside dimensions of such a tire cage may be such that the volume for the entire cage is no larger than approximately three to ten times the volume of the maximum size tire that the tire cage can accept and safely contain an explosion thereof, and preferably the entire cage is no larger than approximately three to seven times the volume of the maximum size tire that the tire cage can accept and safely contain an explosion thereof.

To provide the above transportability features and to additionally provide a more cost effective tire cage for large tires than heretofore possible, it is an aspect of the present invention to use a light weight energy absorbing material such as an energy absorbing metallic foam to cushion the frame of the present tire cage from being damaged by high velocity portions of an exploding tire, and particular, portions of a split rim. The use of such energy absorbing foams substantially reduces the weight and size of the tire cage. Additionally, the tire cage is designed so that the energy absorbing foam can be replaced after it has been crushed while absorbing the impact of portions of an exploding tire. Thus, it is an aspect of the present invention that the tire cage is reusable by substantially merely replacing the crushed foam (and related components for securing the foam in position) after a tire explosion occurs within the tire cage.

In at least some embodiments of tire cage, the energy absorbing foam includes an aluminum foam. Moreover, such foams may have a relative density in a range of 7-12% as one skilled in the art will understand.

Other benefits and features of the present invention will become evident form the accompanying drawing and the Detailed Description hereinbelow.

BRIEF DESCRIPTION OF THE DRAWINGS

FIG. 8 is a side view of the tire cage lid 60.

DETAILED DESCRIPTION OF THE INVENTION

The embodiments of the tire cage 50 illustrated in FIGS. 1-11, and described hereinbelow are particularly suitable for safely containing an explosion of a conventional heavy equipment 8 foot diameter tire, i.e., suitable for safely containing an explosive impact force of up to 3500 to 3700 kiloNewtons (kN) and 1160 kilojoules (kJ) of energy. Accordingly, for safely containing an explosion of a tire of a smaller or larger tire (more particularly, an explosion of a tire storing a substantially larger or smaller amount of energy) certain of the tire cage structural members described herein below, and the forces these members need to withstand may be substantially different from the dimensions provided herein. However, one of ordinary skill in the art will, from the description herein, be able to construct an embodiment of the tire cage 50 for such smaller or larger tires, bearing in mind that, in general, the energy stored in a tire exponentially increases with the diameter of the tire, as discussed in the Summary section hereinabove. Accordingly, embodiments of the present invention are readily applicable to very small tires (e.g., 12 inch diameter tires of a manually maneuverable wheelbarrow), conventional automobile tires, truck tires of various sizes as well as the large tires used in earth moving equipment (e.g., 6 to 12 feet in diameter).

Figure 1:
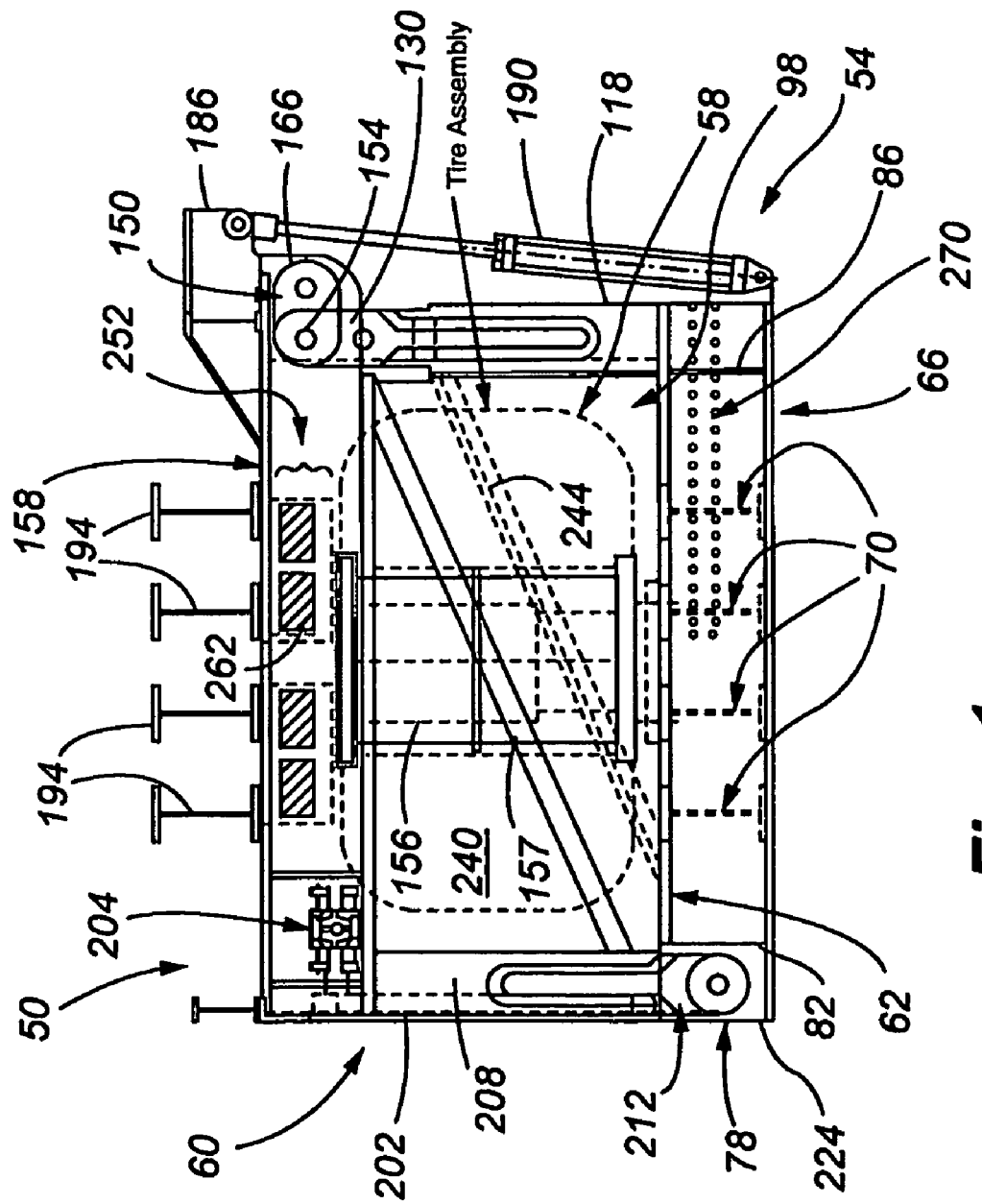
FIG. 1 shows a side view of the tire cage 50 of the present invention, wherein the cage is secured about a tire 58.
Figure 2:
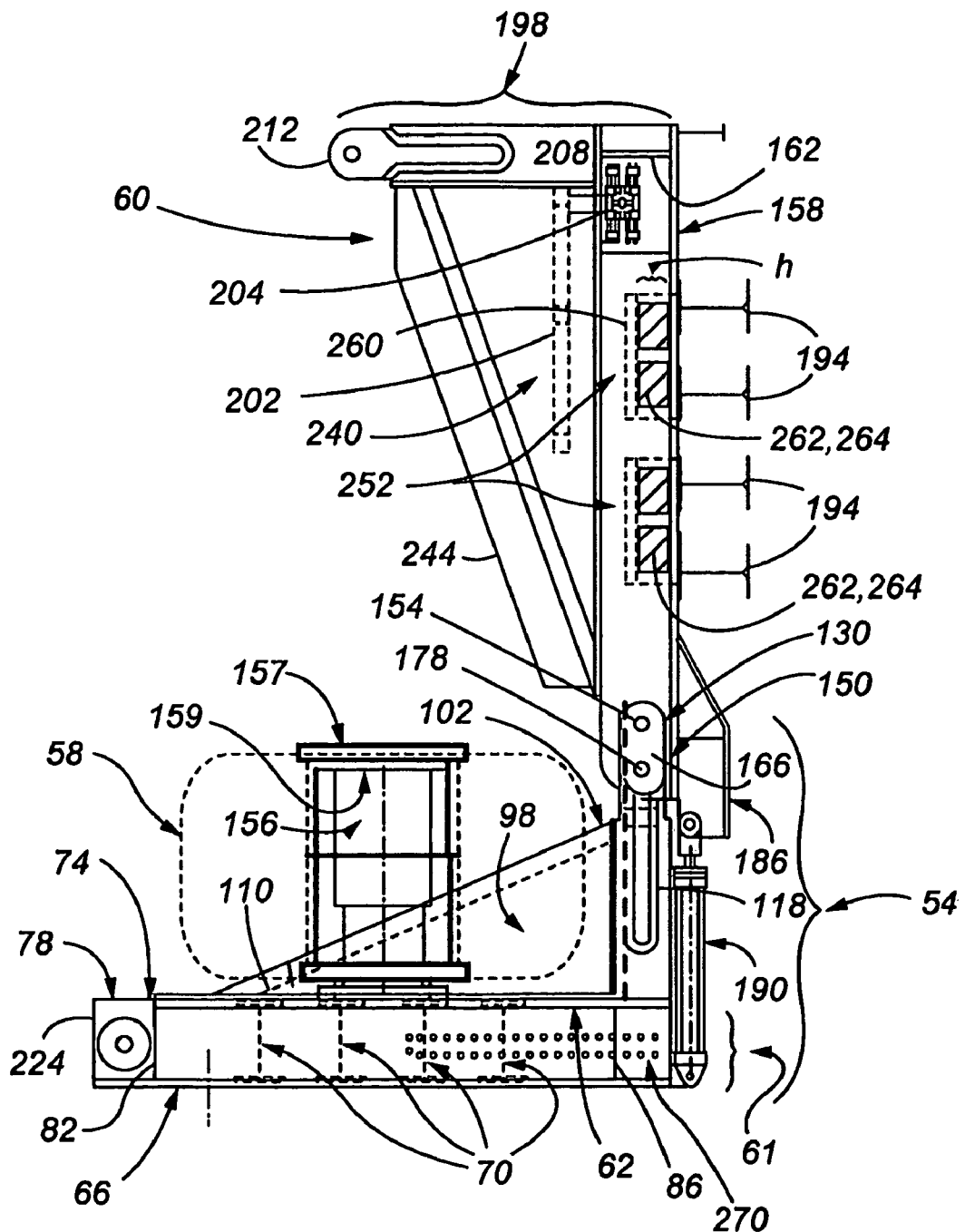
FIG. 2 shows a side view of the tire cage 50 of the present invention, wherein the cage is open.
Figure 3:
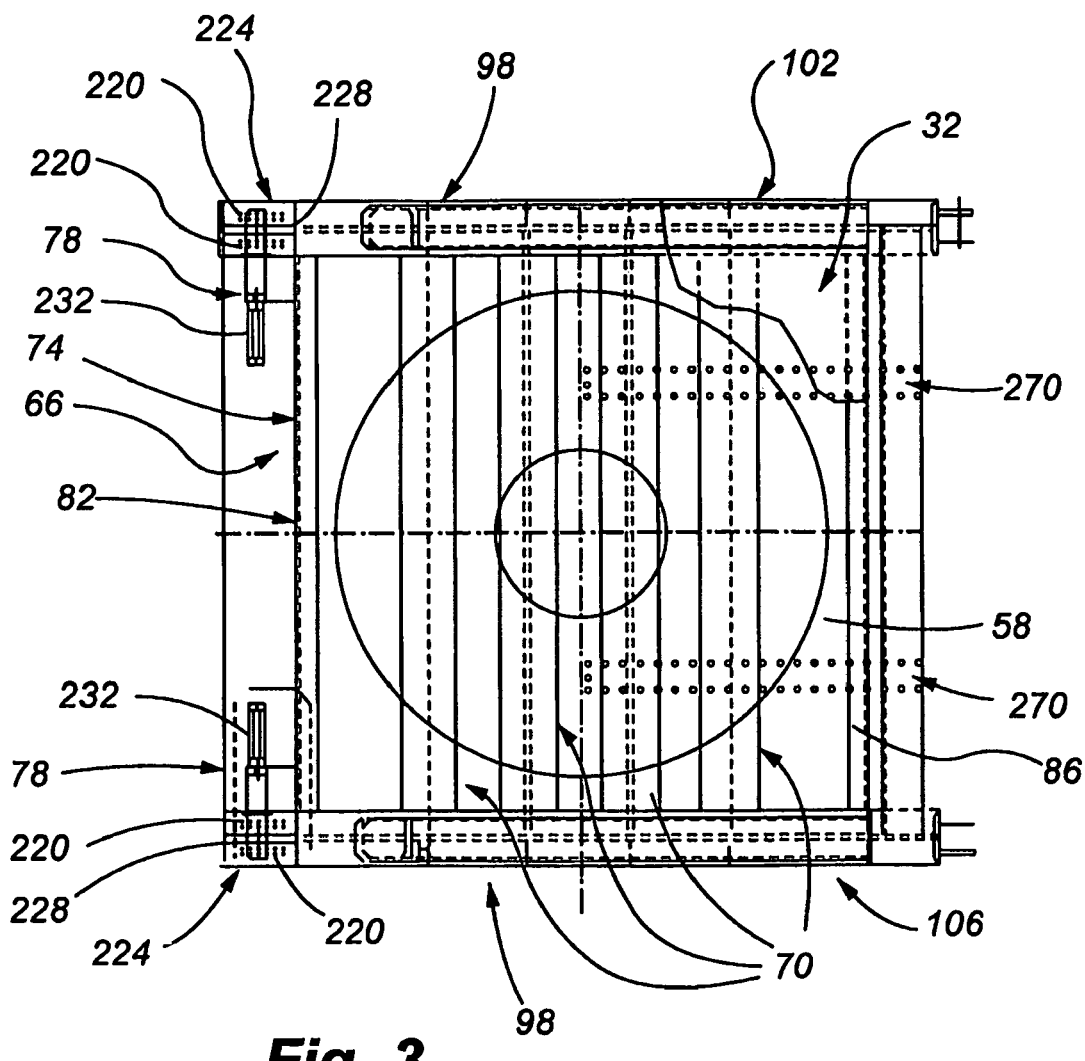
FIG. 3 shows a plan view of the bottom of the tire cage 50.
Figure 4:
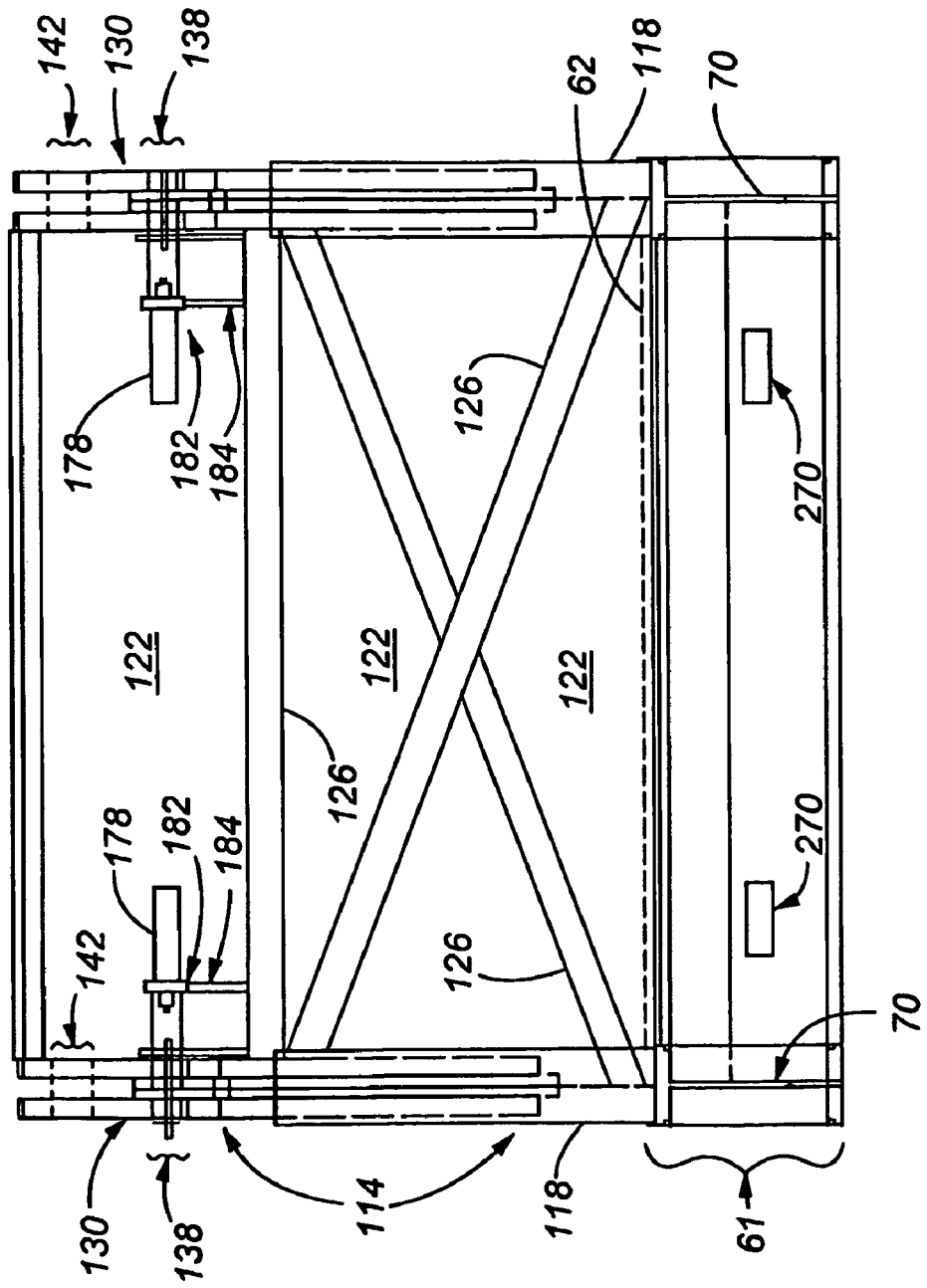
FIG. 4 shows the back or rear of the tire cage 50.
Figure 5:
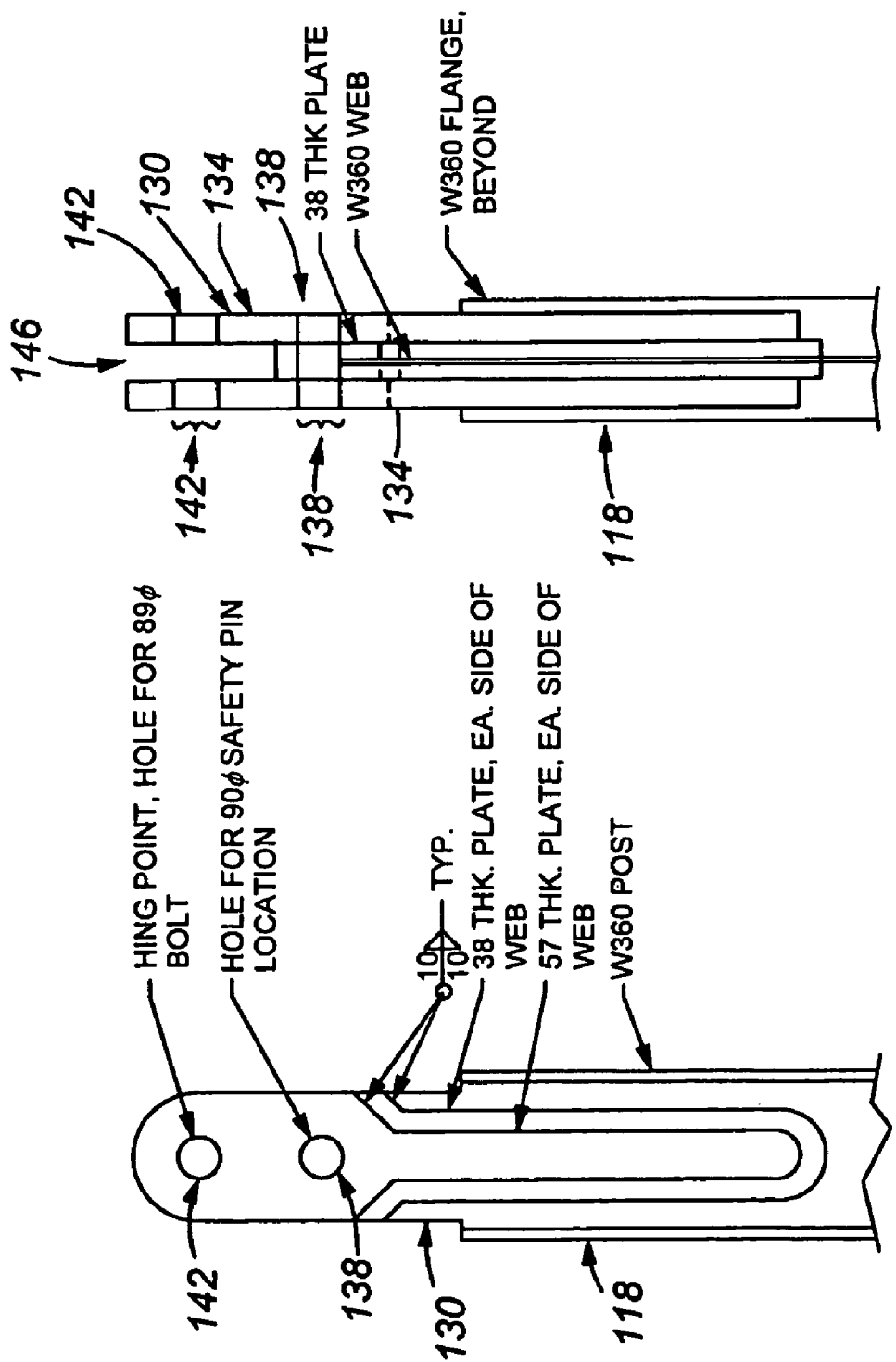
FIGS. 5A and 5B show more detailed views of the posts 118.

Referring to FIGS. 1 through 3, these figures show side and top views of the tire cage 50 of the present invention. The tire cage 50 includes: (a) a tire support assembly 54 for supporting a tire 58 placed within the cage 50, and (b) a pivotally attached lid 60. Each of the support assembly 54 and the lid 60 has a corresponding frame of steel beams and steel plates (as further described hereinbelow and shown in the figures), wherein these frame components are welded together to thereby provide the structural support for the tire cage 50. The tire support assembly 54 includes a support platform 61 (FIG. 2) that provides the support base for the remainder of the tire cage 50. The support platform 61 includes an inner support plate 62, and in some embodiments, an outer support plate 66 may be provided as well. However, in one preferred embodiment, there is no outer support plate 66 since by leaving the bottom of the support platform 61 open, greater accessibility is provided to tire cage cables, pipes, and electrical wiring provided underneath the inner support plate 62. In particular, in the embodiment without the outer support plate 66, the bottom of the tire cage 50 is made from large W-beams (not shown) welded together with a support plate 62 welded on top (thus allowing access underneath for cables, pipe, etc}, wherein this support plate is fixedly attached to (e.g., by welds) a plurality of "I" beams 70 (FIGS. 1, 2 and 4).

The support plates 62 and 66 (or instead of 66, the plate to which the W-beams are welded) are positioned on top of one another so as to have substantially vertically aligned outside perimeters when viewed from below (FIG. 3) with the exception that the inner support plate 62 is shorter along the front or latching side having an edge 74 (FIGS. 2 and 3). The shortened latching side of the inner support plate 62 is shorter by an amount effective for providing locking assemblies 78 for securing the lid 60 to the support assembly 54 when a tire 58 is being examined, inflated and/or deflated within tire cage 50. The support plates 62 and 66 (or instead of 66, the plate to which the W-beams are welded) are steel and are approximately twenty millimeters in thickness. The support plate 62, and the support plate 66 (or the plate to which the W-beams are welded) may be made from G40.21 50 W grade steel. However, it is within the scope of the present invention that another sufficiently strong material may be used so long as it can withstand approximately 3700 kiloNewtons (kN) of force (e.g., for an 8 foot diameter tire) that can be generated by the explosion of a tire 58. Additionally, the "I" beams 70, in the present embodiment, are common structural members conforming to CSA G40.20 and CSA G40. To further stabilize the support assembly 54, various vertical stiffeners such as plates 82, and 86 are provided.

The support assembly 54 also includes two lower side members 98 (FIG. 1) which are mirror images of one another, wherein each projects diagonally vertically upwardly relative to the support plate 62. In the present embodiment, there are side edges 102 (FIGS. 1 and 3) and 106 (FIG. 3), wherein each is a steel plate approximately six millimeters thick with the exception of the upper most diagonal band 110 (FIG. 2) which is comprised of a HSS 102×203×4.8 structural member, as one skilled in the art will understand, this structural member is a tubular member having a rectangular cross section of 4 inches by 8 inches.

The support assembly 54 further includes a back assembly 114 (FIG. 4) that is secured to both the support platform 61 and the lower side members 98. The back assembly 114 includes posts 118 (FIGS. 1, and 4) welded to the support platform 61. Welded to each of the posts 118 is a back plate 122, which may be 6 mm G40.21 50 W Grade Steel or another material of comparable strength. Note that back plate 122 is reinforced by cross members 126 for additional strength, these cross members being HSS 102×102×4.8 structural support members made of G40.21 50 W Grade Steel (i.e., a steel tube having a 4 inch by 4 inch cross section) or another material of comparable strength. Attached to (or integral with) each of the posts 118 is a hinge assembly 130 (FIGS. 4, 5A and 5B) for pivotally attaching the lid 60 to the support assembly 54. Note that each of the hinge assemblies 130 includes a pair of hinge plates 134 (FIG. 5B) that extend to the top of the hinge assembly, and wherein these plates each have a hole 138 and a hole 142 therein, wherein: (i) the holes 138 are aligned with one another as shown in FIGS. 5A and 5B, (ii) the holes 142 are also aligned with one another as shown in FIGS. 5A and 5B, and (iii) at least the pair of holes 142 have a hinge slot 146 therebetween for the insertion of a mating hinge portion 150 (FIGS. 1, 2 and 8) of the lid 60. In particular, for each hinge assembly 130 and its mating hinge portion 150, these components are fitted together with a pivot pin 154 which is provided through the holes 142 and a corresponding aligned hole in the hinge portion 150 so that the lid 60 can pivot on this pivot pin between the fully closed configuration shown in FIG. 1 and the fully open configuration shown in FIG. 2.

The support assembly 54 also includes a tire pedestal 156 (FIGS. 1 and 2) that is secured to the upper surface of the support plate 62. The tire pedestal 156 is for supporting a tire 58 in a properly aligned orientation within the tire cage 50, as one skilled in the art will understand. In particular, the split rim 157 for the tire 58 (symbolically represented in FIGS. 1 and 2 by the heavy lined profile in the center of the tire 58) is aligned on the pedestal 156 so that if a tire malfunction occurs such that one or more portions of the split rim are propelled toward the cage 50 at high velocity, then it is intended that such rim portions will be propelled substantially vertically upwardly toward the inside of the lid 60 as will be discussed further hereinbelow.

Figure 10B:
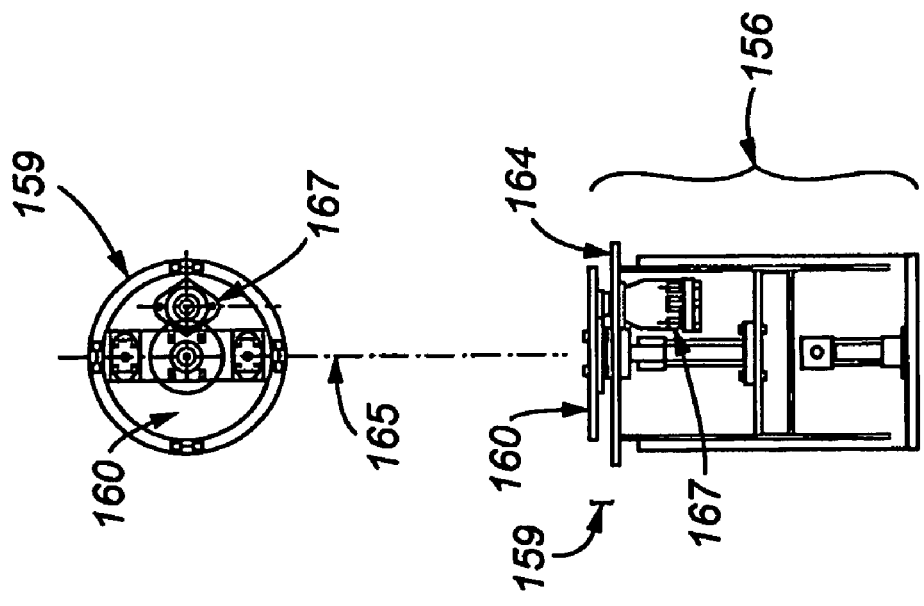
FIGS. 10A and 10B show more detailed views of the pedestal 156 upon which a tire 58 is provided within the cage 50.
Figure 10A:
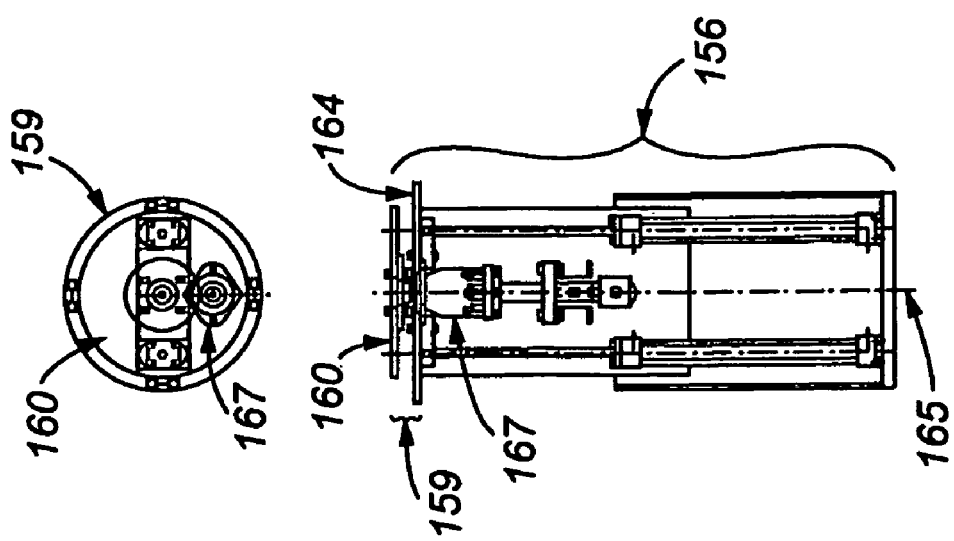

The tire pedestal 156 includes a hydraulic adjustable height table 159 (FIGS. 1, 10A-10B). The table 159 includes a tire support center 160 and a lower table 164 (also FIG. 11). The tire support center 160 is rotatable about the central axis 165 of the generally cylindrical pedestal 156, wherein a motor 167 that is used to rotate the tire support center about the central axis. Accordingly, when a tire 58 is initially positioned in the tire cage 50, the tire pedestal 156 is in the lowered position of FIG. 10B, and subsequently an operator activates hydraulics of the tire cage to raise the table 159 and rotate the tire support center 160 for inspection of the tire 58 during inflation/deflation as one skilled in the art will understand.

Note that the tire pedestal 156 (as well as the rest of the tire cage 50) is configured so that tires smaller than the largest acceptable tire may be safely inflated and/or deflated in the tire cage. In particular, an embodiment of the tire cage 50 according to the disclosure herein may be used for safely inflating and/or deflating tires having diameters of 3 and 6 feet.

Referring to lid 60, it includes two side beams 158 (FIGS. 1, 6, 7 and 8) that extend substantially the length of the lid along its sides. The front end of each of the side beams 158 is attached to a front cross "I" beam 162 (FIG. 6) that extends across the width of the lid 60, and the rear of each of the side beams 158 has attached thereto a corresponding one of the hinge portions 150 (FIGS. 1 and 2). Note that each of the hinge portions 150 includes a pair of bearing plates 166 (FIGS. 1 and 2) attached to opposing sides of the corresponding side beam 158. Each of the bearing plate 166 has two holes 170 and 174 (FIGS. 1 and 8) therein that also extends through the hinge portion 150 (including the side beam 158 to which it is attached). The hole 170 is the hole through which the pivot pin 154 is provided as described hereinabove. Thus, the portion of each bearing plate 166 surrounding its hole 170 includes bushings (not shown) upon which the pivot pin 154 seats for smooth pivotal movement of the lid 60. The hole 174 is for securing the lid 60 in the open position as shown in FIG. 2. Accordingly, when the holes 174 are aligned with the holes 138 such that the lid 60 is in the upright or open position of FIG. 2, there is, for each post 118, a safety pin 178 (FIGS. 2 and 4) for entering and engaging both the hole 174, and the pair of holes 138 in the hinge assembly 130 for the post so that the lid 60 is securely held in the open position. Note that the safety pins 178 are moved between the unengaged positions of FIG. 4 to the engaged position of FIG. 2 by corresponding actuators 182 that are attached, via a mounting plate 184, to one of the back plate support frames 126. Note that the actuators are preferably hydraulic; however, other types of actuators are also within the scope of the invention, including electric and pneumatic.

On top of the rear of each of the side beams 158 is a lever beam 186 to which a hydraulic actuating cylinder 190 is attached in hole 192 (FIG. 8) for pivotally moving the lid 60 between its open and closed positions.

Across the width of the lid 60 and attached to the side beams 158 are a plurality of impact beams 194 (FIGS. 7 and 8) that are W460×120 structural members conforming to CSA G40.21, as one skilled in the art will understand (note that a description of CSA G40.21 may be found at www.csa.org).

Figure 7:
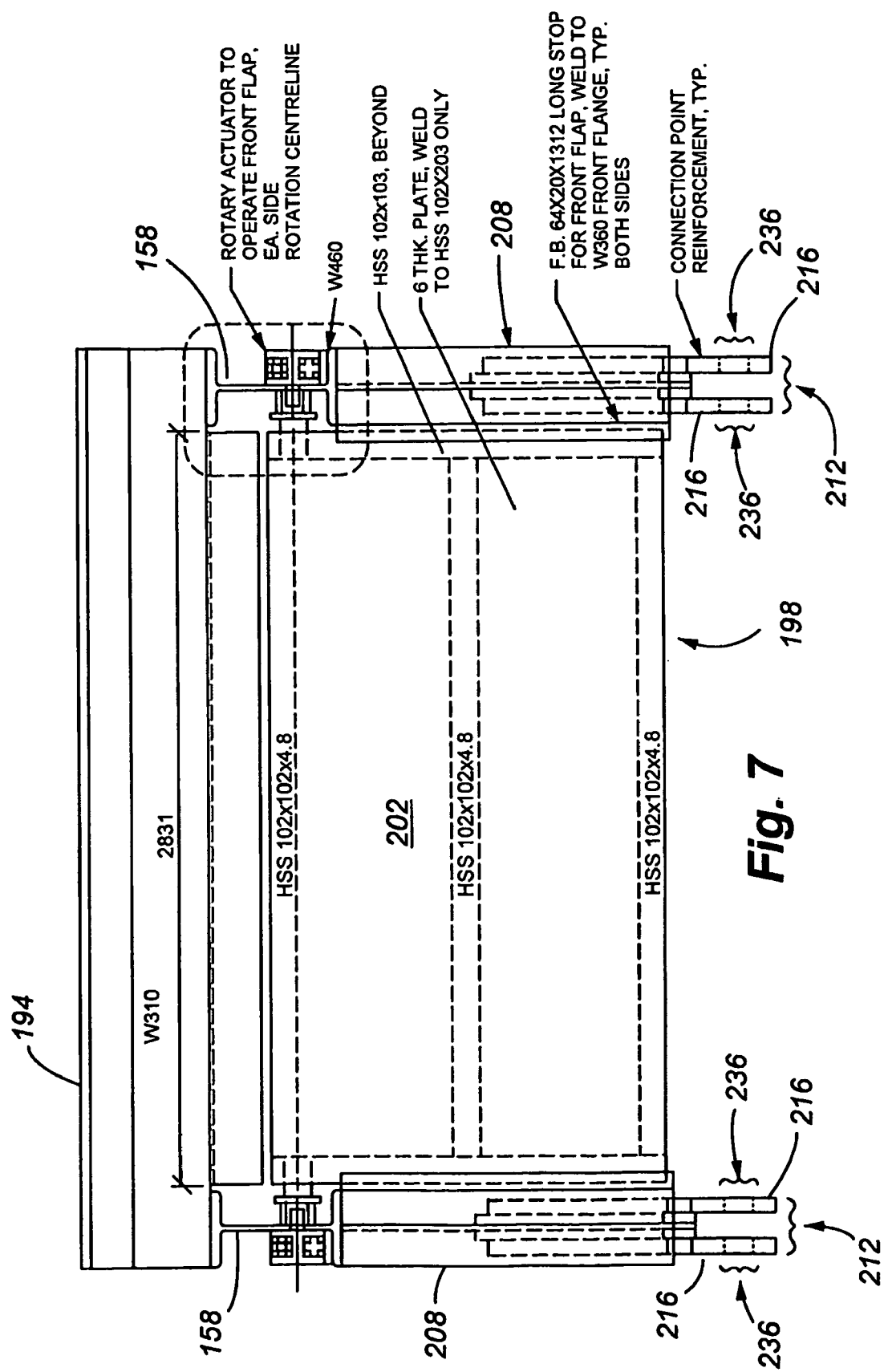
FIG. 7 is a front view of lid 60.

FIG. 7 best shows the front 198 of the lid 60. The front 198 includes a retractable front plate 202 (FIGS. 1, 2, and 7) which may be a steel plate of approximately 6 millimeters thickness. In an extended position, the front plate 202 entirely covers the front 198 when the lid 60 is in the closed position (FIG. 1). In a retracted position, the front plate 202 is substantially parallel to the cross beams 194 and the side beams 158 (FIG. 2) when the lid is in its open position. The front plate 202 is moved between its extended and retracted positions by an actuator 204 (FIGS. 1, 2, and 8). Note that by having the front plate 202 in a retracted position (FIG. 2) when the lid 60 is open, it is much easier to properly place a tire 58 within the tire cage 50. This is particularly important due to the sizes and weights of the tires 58 to be used with the present invention (e.g., tires having a diameter of 6 to 12 feet, and weighing upwards of 2500 lb), since a crane or other similar lifting equipment must be used to hoist the tire 58 above the support assembly 54 and then the tire must be aligned on the tire support pedestal 156 by one or more operators. Thus, the overhead clearance afforded by the present invention in combination with the ease of operator access to a suspended tire 58 due to the front 198 having no walls or barriers is a distinct advantage offered by the present invention.

Two lid posts 208 are additionally provided at the corners of the front 198, wherein each of the posts 208 is attached to one of the side beams 158. Each of the lid posts 208 has extending therefrom a bifurcated connector 212, wherein each of the extensions 216 (FIG. 7) of the connector is received over a corresponding one of the bosses 220 (FIG. 3) in a corresponding one of the locking assemblies 78. In particular, each of the locking assemblies 78 includes a locking enclosure 224 (FIGS. 1-3) having a center steel plate 228 (FIG. 3), wherein there is one of the bosses 220 on each side of the plate 228 and adjacent thereto. Thus, when the lid 60 is in its closed position, each of the connectors 212 can be locked to the support assembly 54 by an actuator 230 of the locking assembly 78. In particular, for locking each connector 212 to the support assembly 54, the actuator moves a pin 232 of the locking assembly 78 through the holes 236 (FIG. 7) of each extension 216 of the connector and also through a hole (not shown) in the plate 228 therebetween when the connector is fully received in the corresponding one of the locking enclosures 224. Conversely, for unlocking the lid 60 from the support assembly 54, the actuator retracts the pins 232 from the holes 236 so that by activating the actuating cylinder 190, the lid 60 can be raised into its open position, and the safety pins 178 can then be moved into holes 138 to lock the lid in the open position.

The lid 60 further includes lid sides 240 (FIGS. 1 and 2), wherein each of the lid sides is approximately 6 millimeters in thickness of steel plate. Each lid side 240 is attached to a corresponding one of: the side beams 158, and a corresponding one of the lid posts 208, such that each side 240 is substantially vertically aligned with and overlaps one of the lower side members 98 when the lid 60 is in its closed position. In particular, a diagonal portion adjacent edge 244 overlaps the corresponding one of the side beams 158 as shown in FIG. 1. Additionally, note that each of the lid sides 240 includes a diagonal reinforcement beam 248 (which may be of type HSS 102×203×4.8, as one skilled in the art will understand) for providing additional strength to the lid sides 240.

Figure 6:
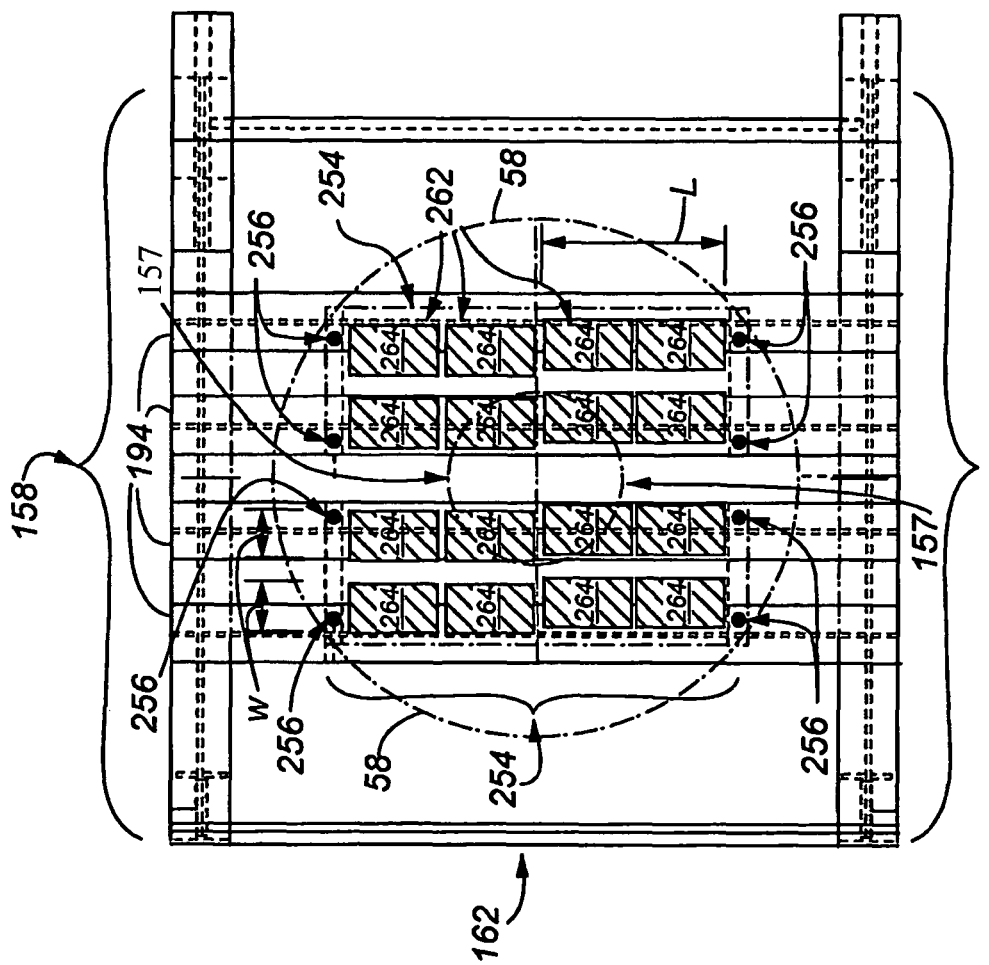
FIG. 6 is a top view of tire cage 50 when the cage is closed about a tire 58 as in FIG. 1.

The lid 60 also includes an energy absorbing structure 252 (FIGS. 1 and 8) for absorbing blast energy from a tire 58 that malfunctions. In particular, when the cage 50 is closed, the energy absorbing structure 252 absorbs energy from portions of the split rim 157 wherein such portions are propelled vertically toward the cross beams 194 such that these cross beams are able to withstand the remainder of a tire blast force without deformation. The energy absorbing structure 252 includes a plurality of energy absorbing assemblies 254 (FIGS. 6, and 8), each such assembly being separately anchored to the cross beams 194 by a plurality of anchors 256, such that these assemblies 254 are spaced apart from one another (such spacing facilitates the expelling of the large air pressures that can develop within the cage 50 when a tire malfunctions). Depending upon the embodiment of the invention, there may be only two such assemblies 254 (e.g., as shown in FIG. 6 in dash-dot-dash outline), wherein each one of the assemblies extends across at least a sufficient amount of the center of the cage immediately above the split rim 157 so that it is unlikely that a portion of this rim can contact the cross beams 194, and it is also unlikely that any portion of the split rim will exit the cage 50. However, other arrangements and sizes of such assemblies 254 are within the scope of the invention. For example, in some embodiments there may be a larger number of such assemblies 254 occupying substantially the same or a greater area than the assemblies 254 of FIG. 6.

Each of the assemblies 254 includes a 2 to 2½ inch thick steel plate 260 (FIG. 2) (also known as a "decoupler plate" herein), wherein the plate may be approximately 28 inches by 74 inches. Each decoupler plate 260 is suspended from the cross beams 194 by the anchors 256 such as threaded steel rods. Between each of the plates 260 and the cross beams 194 are one or more energy absorbing subassemblies 262 (FIG. 6) for each assembly 254, wherein the subassemblies 262 are for absorbing the forces imparted from an exploding tire 58. Although not all subassemblies 262 are labeled in FIG. 6, there are sixteen such subassemblies, one for each of the sixteen blocks 264 shown in FIG. 6. Each of the subassemblies 262 includes a block, pad, or layer 264 (for simplicity denoted herein as "block", and crosshatched in FIGS. 1, 2, 6, and 8) of an energy absorbing material that permanently deforms when absorbing the kinetic energy from, e.g. an exploding tire. Each subassembly 262 also includes two metal plates (not shown). One of the metal plates is bonded to (and covers) the side of the subassembly block 264 wherein this side faces the decoupler plate 260. The other of the metal plates is bonded to (and covers) the opposing side of the block 264 that faces the cross beams 194. In one embodiment, such metal covering plates protect the blocks 264 from damage during shipping, and installation into the assemblies 254. Additionally, for each block 264, its covering plates may provide additional support during tire explosion. In addition, the covering plates and the block 264 for a subassembly 262 are coated with a non-corrosive material to prevent deterioration of the block 264. In at least some embodiments, the non-corrosive material is a chemically applied film of Class 1A gold.

Figure 12:
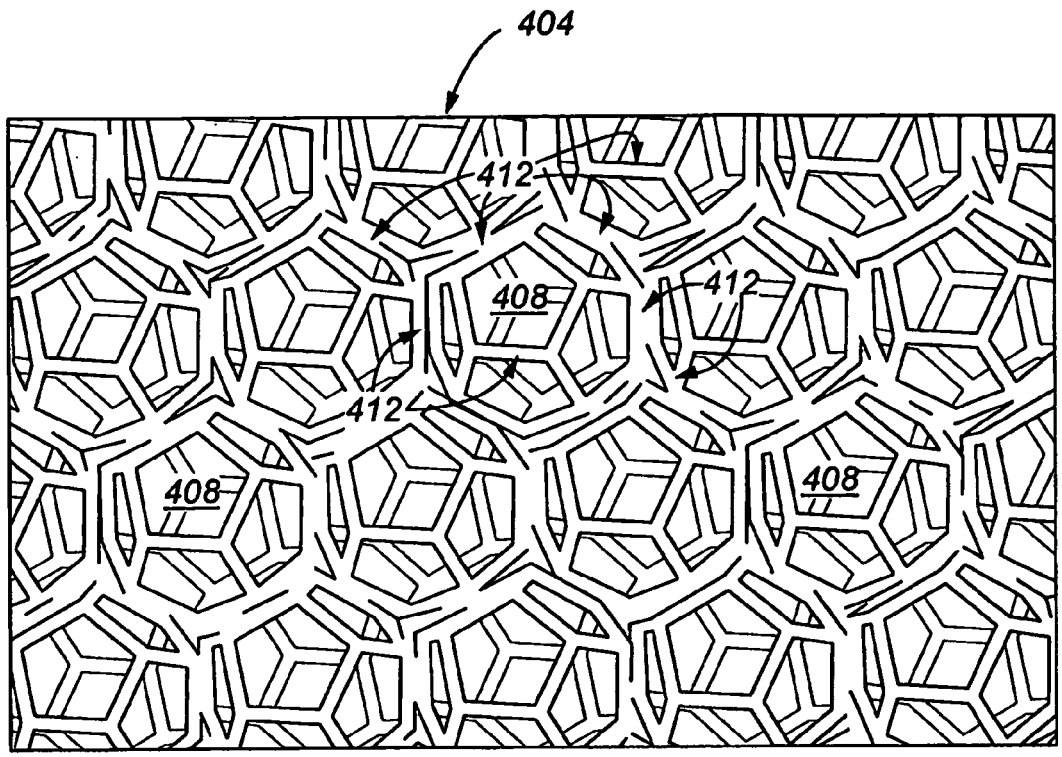
FIG. 12 shows a representation of a cross section of an embodiment of a metallic energy absorbing foam used for the blocks 264.
Figure 13:
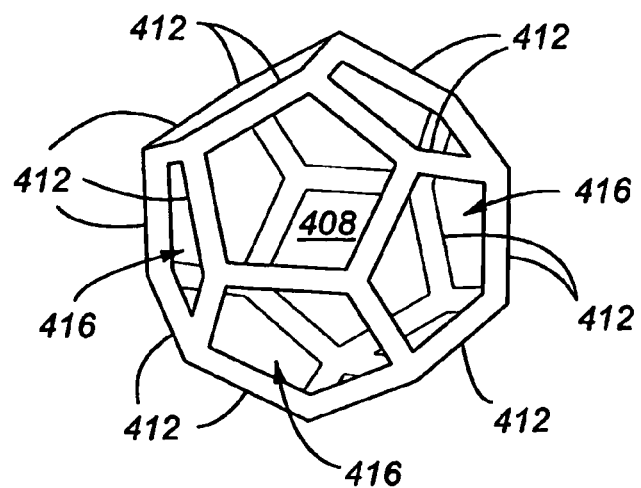
FIG. 13 shows a representation of a single cell 408 of a metallic energy absorbing foam used for the blocks 264.

In one embodiment, each block 264 includes (and may substantially consist of) a rigid energy absorbing material such as what is known in the art as an "open celled foam" material (also denoted herein as simply "foam"). A highly magnified portion 404 of a representation of such a foam is shown in FIG. 12. In particular, such open celled foams include a large plurality of small air filled spaces 408 (denoted cells herein), wherein each of the cells 408 is defined by a plurality of small rods 412 of the foam material in a manner whereby the rods connect together to form open polygonal structures such as, e.g., pentagons or hexagons. One such representation of a cell 408 is shown in FIG. 13. The open polygonal structures form faces 416 of the 3-dimensional cells 408. Generally there are 12 to 14 such faces defining the boundary of a cell 408, and since most of the faces 416 define a portion of the boundary for at least two cells, such rigid open celled foam materials appear upon magnification as similar to a 3-dimensional honeycomb-like structure, as one skilled in the art will understand. Such open celled foam materials may be characterized by: (a) the material of the rods 412, (b) the relative density of the foam, (c) the face size(s), (d) the rod size(s), and (e) the cell shape(s) as one skilled in the art will understand. However, for absorbing energy, the primary strength characteristics are generally (a) and (b) above. Such foams are particularly effective in absorbing high-energy forces in that these foams will structurally deform their cells when impacted by an object and thereby prevent the transfer of energy beyond the foam. The energy absorbing blocks 264 for the present invention may have their rods made substantially of aluminum, an aluminum alloy (e.g., aluminum alloys 6101 or A356 as one skilled in that art will understand), or another metallic alloy such as a nickel or copper alloy. In at least some embodiments of the invention, the blocks 264 are formed from Duocel Aluminum Foam manufactured by ERG Materials and Aerospace Corp., located at 900 Stanford Ave., Oakland, Calif., USA, 94608.

Note that in at least one embodiment of the invention, one or more of the blocks 264 may include a plurality of layers of an energy absorbing material, and in particular, various layers of one or more metallic foams. Having a plurality of layers for one or more of the blocks 264 allows better control in absorbing forces from a tire explosion. In particular, the size, location, and energy absorbing characteristics of the layers within the blocks 264 may be varied. For example, different layers may be fabricated from different metallic foams, from foams of a different relative density, from foams of a different thickness and/or from foams with different crushing characteristics. Moreover, the layers may be layered upon one another in a particular sequence for enhancing the energy and force absorbing characteristics of the blocks 264. For example, a relatively low crush strength foam layer may be the layer contacting the decoupler plate 260 with additional layers having progressively higher crush strengths. Thus, in the event that one of the assemblies 254 is not as forcefully impacted during a tire explosion, it may be that only the layer contacting the decoupler plate 260 must be replaced.

As shown in FIG. 6, substantially the entire surface of a decoupler plate 260 for supporting the blocks 264 (or the subassemblies 262), may be covered by the blocks. All such blocks 264 preferably have the same dimensions and energy absorbing capability for a given embodiment of the tire cage 50. However, such block dimensions and energy absorbing capabilities may be different between embodiments of the tire cage 50, depending, e.g., on the explosiveness (stored energy)

in the tires to be provided in the tire cage 50. Moreover, note that certain advantages are obtained by providing a larger number of small subassemblies 262 such as shown in FIG. 6. In particular, if a tire 58 (and its split rim 157) explodes within the cage 50, it can be that not all of the subassemblies 262 are deformed by the blast. Thus, only those subassemblies 262 affected by the blast need be replaced. In the Appendix hereinbelow, tables are provided identifying various arrangements and densities of foam blocks forming the subassemblies 262, wherein the cross sectional area (parallel to the support surface of the decoupler plate 260) of the foam blocks within each subassembly 262 ranges from 24.5 to 36 in$^2$, and wherein the subassemblies are arranged in various configurations, and have different relative densities ranging from 6.3 to 11.3%. The Appendix tables illustrate that a wide range of subassembly 262 arrangements, sizes, and block 264 densities can be used within the tire cage 50 to absorb at least approximately a tire 58 explosion force of 3500 to 3700 kiloNewtons (as described further in the Appendix hereinbelow), and to absorb approximately 1160 kilojoules (855,853 ft-lbs) of kinetic energy from, e.g., a flange and bead seat band of a split rim tire propelled toward the tire cage 50. Also, note that the collection of subassemblies 262 may extend the entire width of the cage 50, or they may be oriented 90 degrees to the orientation in FIG. 6. Additionally note that the assemblies 254 may be spaced differently for different embodiments.

Since the present invention contemplates that the energy absorbing structure 252 should, in at least one embodiment, be capable of absorbing the force of approximately 3500 to 3600 kiloNewtons of force imparted to the bead seat band/ side ring and lock ring of, e.g., a 96 inch diameter split rim tire 58, the use of such an energy absorbing foam provides the only known way to absorb this amount of force within, e.g., a relatively small volume (e.g., a volume corresponding to the space in the closed cage 50 above the tire 58, wherein the distance between the cross beams 194 and the tire 58 is in the range of 12 to 20 inches), and wherein the cage is not so heavy that it becomes difficult to transport with, e.g., a forklift. In particular, it is desirable that the cage 50 be less than approximately 10-15 tons. Additionally, such foams are the only known materials that can absorb such high forces and still be lightweight. Each of the subassemblies 262 may weigh between 10 and 20 pounds. Thus, in one embodiment, their relative contribution to the weight of the tire cage 50 is approximately less than 2% of the approximate tire cage weight of approximately 7 tons. Moreover, it is believed that if such a light energy absorbing material were not used, the resulting tire cage could weigh as much as 15 tons, require twice the volume for operation, and thus would be very difficult to move between locations without, e.g., dismantling. In particular, it is worthwhile to note that the support assembly 54 may include channels 270 through the "I" beams 70 so that a forklift can transport the tire cage 50 by inserting the forks of the forklift into these channels. Note that in one embodiment, the channels 70 may be enclosed by steel plates for the channel sides, wherein these plates pierce the "I" beams and are welding thereto.

As mentioned above, various arrangements and relative densities of Duocel manufactured energy absorbing aluminum blocks 264 (more precisely, the subassemblies 262) have been determined to be effective in absorbing a force of approximately 3500 to 3600 kiloNewtons (equivalently, approximately 786,795 to 809,275 lb-ft). Representative arrangements are provided in the Appendix. It is preferred that each of the blocks 264 have a width "w" (FIG. 6) and a length "L" of at least 4 inches. However, it should be noted that, depending on the relative density, crushing properties (i.e., crushing plateaus between 190-538.9 psi), and material used to fabricate the foam, the blocks 264 may have virtually any length and width ranges that can be accommodated within the tire cage 50. Additionally, it is preferred that each block 264 have a ratio of thickness "h" (FIG. 2) to the smaller of the width "w" and length "L" of no more than 2:1. Accordingly, for blocks 264 (or subassemblies 262) where "h" is eight inches, both the width "w" and the length are at least four inches.

Figure 9A:
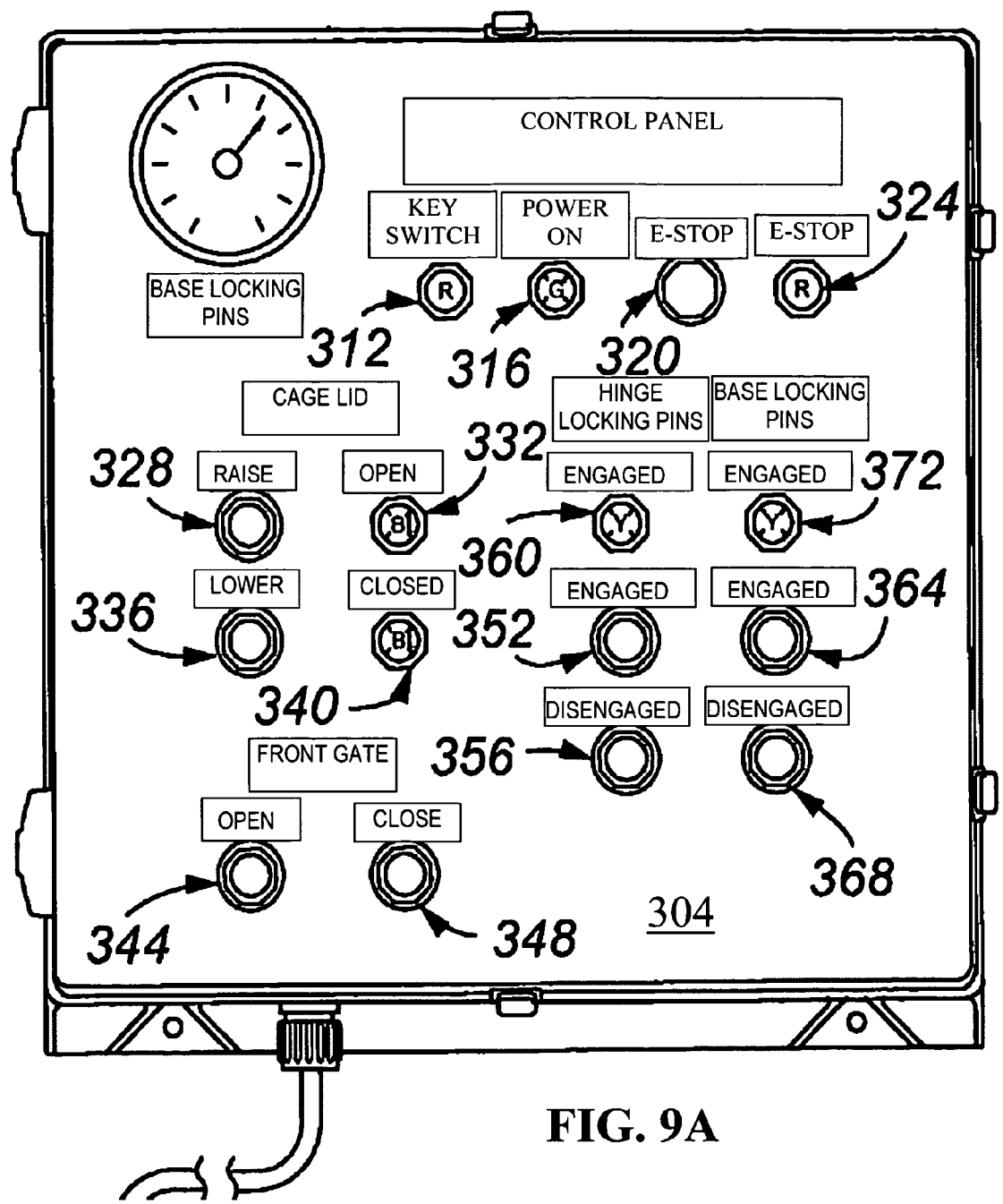
FIGS. 9A and 9B shows the operator controls for operating the tire cage 50.
Figure 9B:
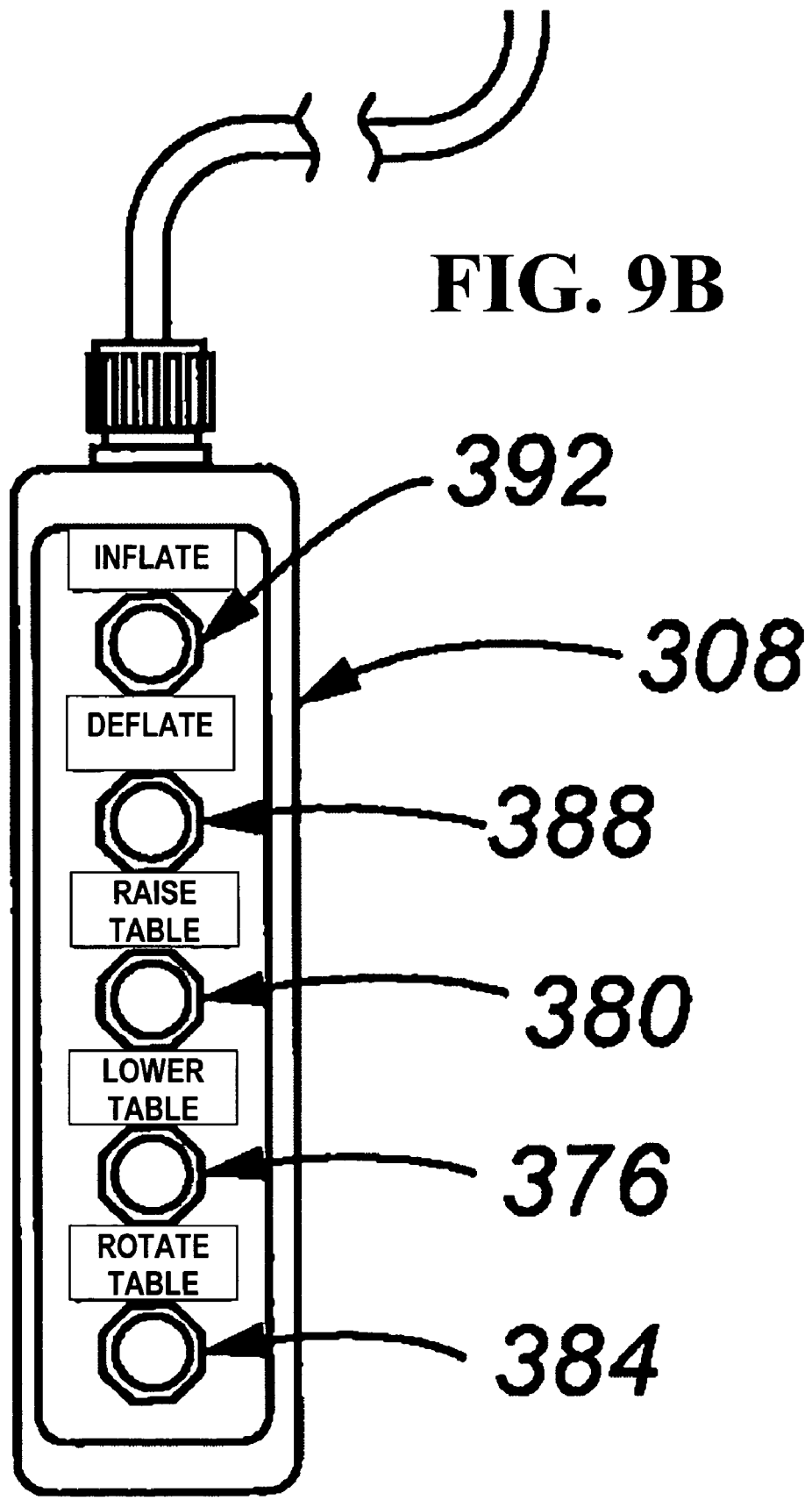
Figure 11:
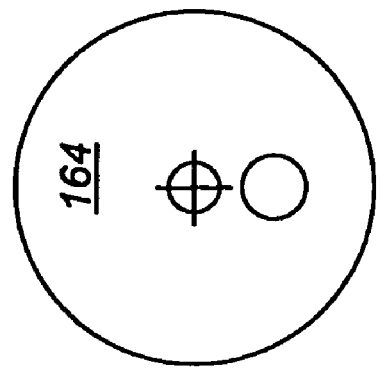
FIG. 11 is a view top view of the lower table 164.

The tire cage 50 also includes an electronic control subsystem for controlling lid 60 positioning and the inflating of a tire 58. FIGS. 9A and 9B shows an illustrative embodiment of the operator controls for the tire cage. In particular, there is an operator console 304 that may be fixedly attached to tire cage 50 on, e.g., a side thereof, wherein this console includes all of the operator controllable functions for operating the tire cage 50. In addition, a portable controller 308 is operably connected to the console 304. Accordingly, an operator can access most of the functionality to control the tire cage 50 via the controller 308 while walking around the tire cage and/or staying a safe distance therefrom. The following are brief descriptions of the operator controls shown in FIGS. 9A and 9B:

(a) A key switch 312 for inserting a key to operate the tire cage 50.

(b) A power on light 316 indicating whether there is electrical power to the console 304.

(c) An emergency stop button 320 for stopping movement of the lid 60 and/or inflation of a tire 58.

(d) An emergency stop light 324 for showing that an emergency stop has been activated.

(e) A raise lid button 328 for raising the lid 60 toward the lid position of FIG. 2.

(f) An indicator light 332 for indicating when the lid 60 is fully raised in the open position.

(g) A lower lid button 336 for lowing the lid 60 toward the lid position of FIG. 1.

(h) An indicator light 340 for indicating when the lid 60 is fully lowered onto the tire support assembly 54.

(i) A button 344 for retracting the front plate 202 toward its position in FIG. 2.

(j) A button 348 for extending the front plate 202 toward its position in FIG. 1.

(k) A hinge locking button 352 for activating the actuators 182 (FIG. 4) for moving the safety pins 178 from their positions as shown in FIG. 4 to positions of being seated in their corresponding hole 138 of a post 117 and corresponding hole 174 of the lid (FIG. 8).

(l) A hinge unlocking button 356 for activating the actuators 182 (FIG. 4) for moving the safety pins 178 from their locked positions (wherein these pins are seated in their corresponding hole 138, and corresponding hole 174) to their positions as shown in FIG. 4.

(m) An indicator light 360 for indicating when the lid 60 locked into the position of FIG. 2.

(n) A support assembly locking button 364 for activating the hydraulic locking members 78 (FIG. 3) for moving the pins 232 from their positions as shown in FIG. 3 to positions of being seated in their corresponding hole 236 (FIG. 7) of the lid 60 and corresponding boss 220 of the support assembly 54 (FIG. 3).

(o) A support assembly unlocking button 368 for activating the hydraulic locking members 78 (FIG. 3) for moving the pins 232 from their locked positions (wherein these pins are seated in their corresponding hole 236 (FIG. 7), and corresponding boss 220 (FIG. 3)) to their positions as shown in FIG. 3.

(p) An indicator light 372 for indicating when the lid 60 is locked to the support assembly 54.

(q) A button 376 on the controller 308, the button for lowing the table 159 (by hydraulics or other well-known techniques such as pneumatics, screw jacks and electro/mechanical actuators, etc.).

(r) A button 380 on the controller 308 for raising the table 159.

(s) A button 384 on the controller 308 for rotating the tire support center 160 inspection of the tire.

(t) A button 388 on the controller 308 for deflating a tire 58.

(u) A button 392 on the controller 308 for inflating a tire 58.

To operate the tire cage 50, a tire 58 must be positioned on the tire pedestal 156 as shown in, e.g., FIGS. 1 and 2. Accordingly, to provide the tire 58 in this position, the lid 60 must in the position shown in FIG. 2 with the safety pins 178 (FIG. 4) seated within their corresponding holes 138 of each of the posts 118 and their corresponding holes 174 in the lid. Additionally, the front plate 202 should also be in its retracted position as shown in FIG. 2, and the pedestal 156 should be in its lower position (FIG. 10B). Subsequently, a tire 58 that is suspended in the air via, e.g., a hoist (not shown) lowers the tire onto the pedestal 156. Once the tire 58 is positioned on the pedestal 156, the table 159 can be raised (via button 380) so that the tire is supported on the support center 160. The tire support center 160 can then be rotated (via button 384) for inspection. Note that the control subsystem will not allow the tire 58 to be inflated or deflated unless the cage 50 is fully secured about the tire. Accordingly, the operator must disengage the safety pins 178 from their corresponding holes 174 in the lid 60 (via the button 356), and then lower the lid 60 (via button 336) by activating the hydraulic cylinder 190. Additionally, the operator must extend the front plate 202 (via button 348) so that when the lid 60 is in the position of FIG. 1, the front plate is also in the position shown in this figure. The operator then locks the lid 60 to the support assembly 54 via the button 364, and may then commence inflating or deflating the tire 58.

During the inflation or deflation process, the tire 58 may explode thereby propelling tire fragments in various directions, and in particular, portions of the split rim 157 may be propelled toward the lid 60. Upon impact by a portion of, e.g., the split rim 157 during a tire 58 explosion, each plate 260 disperses the impact of the various portions of the tire 58 (and in particular portions of the split rim 157) the over the subassemblies 262 that reside between the decoupler plate 260 and the cross beams 194. Accordingly, the kinetic forces of the tire fragments projected toward the lid 60 are effectively absorbed by the even distribution of such blast forces on the subassemblies 262 which would otherwise not occur if there were no decoupler plate 260. Additionally, the plate 260 acts as a large kinetic energy reflecting mass to "decouple" at least a portion of the kinetic energy, e.g., of the split rim 157 during tire explosion, from being transmitted to the subassemblies 262. Note that the decoupler plates 260 are reusable in subsequent tire explosions.

Note that after a tire explosion has occurred within the tire cage 50, the cage may then be opened and the remnants of the tire and its split rim 157 can be removed. Since most of the blast impact was absorbed by the energy absorbing structure 252, the remainder of the tire cage 50 is reusable by replacing the damaged portions of the energy absorbing structure. In particular, one or more of the anchors 256, and one or more of the subassemblies 262 will likely require replacement. However, the tire cage 50 is constructed so that such replacement being relatively straightforward.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

APPENDIX

In order to test various combinations of metallic foams for absorbing energy from a tire explosion, tests of various arrangements of various types of metallic foams was conducted. It was assumed that the total impact force of an energy absorption structure 252 (FIGS. 1 and 8) should be approximately 3,546 kiloNewtons or equivalently 797,136 foot-pounds. With 16 subassemblies 262 (FIG. 6) per energy for the energy absorbing structure 252 (each having a single unitary foam block 264), this equates to 49,821 lb-feet of energy absorption per subassembly 262. Moreover, the tests were configured using various arrangements of a plurality of subassemblies 262, wherein for most of the arrangements the subassemblies had blocks 264 of differing characteristics (e.g., such characteristics as block length, block width, block foam density, and crush plateau, i.e., the maximum crushing force that can be absorbed before substantially all subsequently applied forces are entirely transferred through the block). Accordingly, an arrangement could include: (i) one or more "primary blocks" having particular block characteristics, (ii) one or more "second blocks" having different block characteristics, and in some tests (iii) one or more "tertiary blocks" having yet another different set of block characteristics.

In performing the tests, the following additional constraints were imposed on the arrangements:

(a) Neither the length nor the width of any individual subassembly 262 was be less than four inches in order to maintain at least a 1:2 ratio with the eight inch height (i.e., thickness) of each block 264. Note that it is believed that by maintaining such a ratio, a global buckling of the blocks during compression can be prevented.

(b) The primary blocks were located at substantially the four corners of the decoupling plate 260.

(c) Any adjustments in the arrangement were accomplished by rearranging the blocks not located at substantially the four corners of the decoupling plate 260.

(d) All metallic foams were aluminum foams.

Thirty-two different arrangements were tested, all arrangements providing substantially identical energy absorbing performance and having substantially identical overall dimensions. The following three tables describe the thirty-two arrangements tested, wherein the first table describes the how the primary blocks were arranged for each of the thirty-two arrangements, the second table describes the how the (any) secondary blocks were arranged for each of the thirty-two arrangements, and the third table describes the how the (any) tertiary blocks were arranged for each of the thirty-two arrangements.

TABLE 1

| Subassembly | Primary Foam Density | Heat Lot | Block Length (in.) | Block Width (in.) | Number of Blocks | Position of Blocks | Crush Plateau (PSI) | Subassembly |
|---|---|---|---|---|---|---|---|---|
| 1* | 9.6 | 10223-1 | 5.505 | 6.000 | 4 | All Corners | 377.07 | 1* |
| 2 | 8.1 | 10223-1/5320-1 | 5.796 | 6.000 | 2 | Opposite Corners | 289.86 | 2 |
| 3 | 7.8 | 10223-1/5320-1 | 4.752 | 7.000 | 4 | All Corners | 272.42 | 3 |
| 4 | 7.7 | 10223-1/5320-1 | 6.000 | 6.000 | 2 | Opposite Corners | 266.61 | 4 |
| 5 | 10.0 | 10223-1 | 5.000 | 7.000 | 2 | Opposite Corners | 400.33 | 5 |
| 6 | 10.0 | 10223-1 | 5.000 | 7.000 | 2 | Opposite Corners | 400.33 | 6 |
| 7 | 10.0 | 10223-1 | 5.000 | 7.000 | 2 | Opposite Corners | 400.33 | 7 |
| 8* | 9.7 | 8186-1 | 5.351 | 6.000 | 2 | Opposite Corners | 382.89 | 8* |
| 9 | 9.8 | 8186-1 | 6.000 | 6.000 | 2 | Opposite Corners | 388.70 | 9 |
| 10 | 9.7 | 8186-1 | 6.000 | 6.000 | 2 | Opposite Corners | 382.89 | 10 |
| 11 | 8.3 | 10223-1/5320-1 | 6.000 | 6.000 | 2 | Opposite Corners | 301.49 | 11 |
| 12 | 9.9 | 8186-1 | 5.000 | 7.000 | 2 | Opposite Corners | 394.52 | 12 |
| 13 | 8.5 | 10223-1 | 5.000 | 7.000 | 2 | Opposite Corners | 313.12 | 13 |
| 14 | 8.2 | 10223-1/5320-1 | 6.000 | 6.000 | 4 | All Corners | 295.68 | 14 |
| 15 | 8.1 | 10223-1/5320-1 | 5.000 | 7.000 | 4 | All Corners | 289.86 | 15 |
| 16 | 9.6 | 10223-1/5320-1 | 6.000 | 6.000 | 2 | Opposite Corners | 377.07 | 16 |
| 17 | 8.3 | 10223-1 | 6.000 | 6.000 | 2 | Opposite Corners | 301.49 | 17 |
| 18 | 9.7 | 10223-1/5320-1 | 4.000 | 6.942 | 4 | All Corners | 382.89 | 18 |
| 19 | 9.1 | 10223-1/5320-1 | 4.000 | 6.848 | 4 | All Corners | 348.00 | 19 |
| 20 | 8.2 | 10223-1/5320-1 | 4.000 | 6.910 | 4 | All Corners | 295.68 | 20 |
| 21 | 8.3 | 8186-1 | 4.000 | 6.776 | 4 | All Corners | 301.49 | 21 |
| 22* | 8.6 | 10223-1/5320-1 | 4.000 | 6.904 | 4 | All Corners | 318.93 | 22* |
| 23 | 7.8 | 10223-1/5320-1 | 5.000 | 7.000 | 4 | All Corners | 272.42 | 23 |
| 24 | 8 | 10223-1/5320-1 | 4.000 | 6.739 | 4 | All Corners | 284.05 | 24 |
| 25 | 8 | 10223-1/5320-1 | 4.000 | 6.856 | 4 | All Corners | 284.05 | 25 |
| 26 | 8 | 10223-1/5320-1 | 4.000 | 6.856 | 4 | All Corners | 284.05 | 26 |
| 27 | 8 | 10223-1/5320-1 | 4.000 | 6.769 | 4 | All Corners | 284.05 | 27 |
| 28 | 8 | 10223-1/5320-1 | 6.000 | 6.000 | 4 | All Corners | 284.05 | 28 |
| 29 | 8.1 | 10223-1/5320-1 | 5.000 | 6.866 | 4 | All Corners | 289.86 | 29 |
| 30 | 8.1 | 10223-1/5320-1 | 5.000 | 6.866 | 4 | All Corners | 289.86 | 30 |
| 31 | 8.2 | 10223-1 | 6.000 | 6.000 | 4 | All Corners | 295.68 | 31 |
| 32 | 8.3 | 10223-1/5320-1 | 5.000 | 6.775 | 4 | All Corners | 301.49 | 32 |

TABLE 2

| Subassembly | Secondary Foam Density | Heat Lot | Block Length (in.) | Block Width (in.) | Number of Blocks | Position of Blocks | Crush Plateau (PSI) |
|---|---|---|---|---|---|---|---|
| 1* | | | | | | | |
| 2 | 10.2 | 8186-1 | 6.000 | 6.000 | 2 | Opposite Corners | 411.96 |
| 3 | 9.6 | 10223-1/5320-1 | 6.000 | 6.000 | 1 | Center | 377.07 |
| 4 | 7.6 | 10223-1 | 6.000 | 6.000 | 2 | Opposite Corners | 260.79 |
| 5 | 8.7 | 10223-1 | 4.794 | 7.000 | 2 | Opposite Corners | 324.75 |
| 6 | 8.5 | 10223-1/5320-1 | 5.801 | 6.000 | 2 | Opposite Corners | 313.12 |
| 7 | 8.4 | 10223-1/5320-1 | 5.911 | 6.000 | 2 | Opposite Corners | 307.31 |
| 8* | 6.3 | 10223-1 | 6.000 | 6.000 | 2 | Opposite Corners | 185.21 |
| 9 | 8.4 | 10223-1/5320-1 | 5.921 | 6.000 | 2 | Opposite Corners | 307.31 |
| 10 | 10.6 | 10223-1/5320-1 | 4.000 | 6.391 | 2 | Opposite Corners | 435.21 |
| 11 | 8.0 | 10223-1/5320-1 | 6.000 | 6.000 | 2 | Opposite Corners | 284.05 |
| 12 | 6.6 | 10223-1 | 6.000 | 6.000 | 2 | Opposite Corners | 202.65 |
| 13 | 8.4 | 10223-1/5320-1 | 6.000 | 6.000 | 2 | Opposite Corners | 307.31 |
| 14 | 7.1 | 10223-1/5320-1 | 4.466 | 7.000 | 1 | Center | 231.72 |
| 15 | 8.4 | 10223-1 | 4.295 | 7.000 | 1 | Center | 307.31 |
| 16 | 6.8 | 8186-1 | 6.000 | 6.000 | 2 | Opposite Corners | 214.28 |
| 17 | 10.5 | 10223-1/5320-1 | 4.000 | 6.121 | 2 | Opposite Corners | 429.40 |
| 18 | 6.6 | 10223-1 | 6.000 | 6.000 | 1 | Center | 202.65 |
| 19 | 8.7 | 10223-1/5320-1 | 6.000 | 6.000 | 1 | Center | 324.75 |
| 20 | 11.3 | 8186-1 | 6.000 | 6.000 | 1 | Center | 475.91 |
| 21 | 11.3 | 8186-1 | 6.000 | 6.000 | 1 | Center | 475.91 |
| 22* | 6.6 | 10223-1 | 6.000 | 6.000 | 2 | Top/Bottom Center | 202.65 |
| 23 | 8.7 | 10223-1/5320-1 | 5.995 | 6.000 | 1 | Center | 324.75 |
| 24 | 7.7 | 10223-1/5320-1 | 6.000 | 6.000 | 2 | Top/Bottom Center | 266.61 |
| 25 | 7.8 | 10223-1/5320-1 | 5.000 | 6.850 | 2 | Top/Bottom Center | 272.42 |
| 26 | 7.7 | 10223-1/5320-1 | 5.000 | 7.000 | 2 | Top/Bottom Center | 266.61 |
| 27 | 7.9 | 10223-1 | 5.000 | 6.850 | 2 | Top/Bottom Center | 278.24 |
| 28 | 7.4 | 10223-1 | 5.965 | 6.000 | 1 | Center | 249.17 |
| 29 | 7.9 | 10223-1 | 6.000 | 6.000 | 1 | Center | 278.24 |
| 30 | 7.9 | 10223-1 | 6.000 | 6.000 | 1 | Center | 278.24 |
| 31 | 6.6 | 10223-1 | 6.000 | 5.957 | 1 | Center | 202.65 |
| 32 | 7.4 | 10223-1 | 6.000 | 6.000 | 1 | Center | 249.17 |

TABLE 3

| Subassembly | Tertiary Density | Heat Lot | Block Length | Block Width | Number of Blocks | Position of Blocks | Crush Plateau (PSI) | Crush Force (lbf) |
|---|---|---|---|---|---|---|---|---|
| 1* | | | | | | | | 49821 |
| 2 | | | | | | | | 49821 |
| 3 | | | | | | | | 49821 |
| 4 | 9.6 | 10223-1/5320-1 | 5.237 | 6.000 | 1 | Center | 377.07 | 49821 |
| 5 | | | | | | | | 49821 |
| 6 | | | | | | | | 49821 |
| 7 | | | | | | | | 49821 |
| 8* | 8.8 | 10223-1 | 6.000 | 6.000 | 1 | Center | 330.56 | 49821 |
| 9 | | | | | | | | 49821 |
| 10 | | | | | | | | 49821 |
| 11 | 7.0 | 10223-1/5320-1 | 5.000 | 6.783 | 1 | Center | 225.91 | 49821 |
| 12 | 7.0 | 10223-1/5320-1 | 5.000 | 6.741 | 1 | Center | 225.91 | 49821 |
| 13 | 6.4 | 10223-1/5320-1 | 5.040 | 6.000 | 1 | Center | 191.03 | 49821 |
| 14 | | | | | | | | 49821 |
| 15 | | | | | | | | 49821 |
| 16 | 7.1 | 10223-1/5320-1 | 4.466 | 7.000 | 1 | Center | 231.72 | 49821 |
| | | | | | | | Total (lbf): | 797136 (3546 kN) |
| 17 | 6.5 | 8186-1 | 6.000 | 6.000 | 1 | Center | 196.84 | 49821 |
| 18 | | | | | | | | 49821 |
| 19 | | | | | | | | 49821 |
| 20 | | | | | | | | 49821 |
| 21 | | | | | | | | 49821 |
| 22* | | | | | | | | 49821 |
| 23 | | | | | | | | 49821 |
| 24 | | | | | | | | 49821 |
| 25 | | | | | | | | 49821 |
| 26 | | | | | | | | 49821 |
| 27 | | | | | | | | 49821 |
| 28 | | | | | | | | 49821 |
| 29 | | | | | | | | 49821 |
| 30 | | | | | | | | 49821 |
| 31 | | | | | | | | 49821 |
| 32 | | | | | | | | 49821 |

What is claimed is:

1. A method for manufacturing a tire cage for containing explosions of a plurality of tires during inflation or deflation comprising:

providing an enclosure for receiving tires within an interior of the enclosure, said enclosure having at least one rigid member adjacent to at least a portion of the interior for placing the tires;

providing an energy absorbing material having a plurality of rigid open cells, the cells having a plurality of faces, each face of the plurality of the faces defined by a plurality of rods enclosing open space of the face; and wherein the energy absorbing material is positioned between the at least one rigid member and the at least one portion of the interior for placing the tires, wherein during an explosion of one of the tires in the enclosure, a crushing of the energy absorbing material is effective for absorbing a sufficient amount of kinetic energy of debris from the one tire so that by replacing the energy absorbing material, the at least one rigid member is effective for withstanding an explosion of another of the tires within the enclosure;

transporting the tire cage without dismantling the at least one rigid member from a remainder of the enclosure; and further including providing operator controls outside of the enclosure for use by an operator for at least one of inflating and deflating one or more of the tires provided in the enclosure;

wherein the operator controls include a user control for raising at least one of the tires provided on a tire support in the enclosure.

2. The method of claim 1 further including providing said energy absorbing material so that the energy absorbing material is attached to a portion of the enclosure that opens upwardly to an open position for providing the one tire therein, and closes for thereby positioning the energy absorbing material within an additional space.

3. The method of claim 2, wherein when the tire cage is configured for providing the one tire within the interior, in the open position, the position provides access to the interior so that there is sufficient space above a pedestal of the support for positioning the one tire on the pedestal, wherein a central opening of the one tire and a split rim therein are vertically aligned when the one tire is positioned on the pedestal.

4. The method of claim 2, wherein said energy absorbing material includes a metallic foam having the rigid open cells.

5. The method of claim 4, wherein said metallic foam includes aluminum or an aluminum alloy.

6. The method of claim 1, wherein the energy absorbing material substantially evenly and permanently compresses between the at least one rigid member and a second rigid member during the explosion of the one tire so that upon an explosion of the one tire, an explosive force therefrom is transmitted from the second rigid member to the energy absorbing material.

7. The method of claim 6, wherein the second rigid member is sufficiently rigid to be reused in an explosion of another one of the tires in the interior.

8. The method of claim 6, wherein after the explosion of the one tire, an additional portion of the energy absorbing material is operably positioned between the second rigid member, and the at least one rigid member during a replacement of a deformed portion of the energy absorbing material.

9. The method of claim 8, wherein the second rigid member is attached to a lid and moves with the lid between an open and a closed position.

10. The method of claim 6, wherein the second rigid member causes different portions of said energy absorbing material to deform substantially uniformly during the explosion wherein the second rigid member is sufficiently rigid to be reused in an explosion of another of the tires in the interior.

11. The method of claim 1, wherein said enclosure is effective for enclosing a tire that is at least six feet in diameter.

12. The method of claim 1, wherein the enclosure includes a hinged lid that is movable between an open position for receiving the one tire into the interior, and a closed position for covering the one tire when the one tire is positioned within the interior, and the energy absorbing material is attached to the lid and moves with the lid between the open and the closed positions.

13. The method of claim 12, wherein the enclosure includes an actuator for securing the lid in the open position, via activation of a locking mechanism, so that the enclosure can receive the tires.

14. The method of claim 1, wherein the energy absorbing material has a crushing plateau between 190 and 538.9 psi.

15. The method of claim 1, wherein for at least a portion of a side wall of the tire cage, the operator controls include a control for moving the portion of the side wall between a first position for enclosing the interior and a second position wherein the interior is not enclosed, wherein the portion of the side wall is attached to and moveable with a moveable lid of the tire cage, and the control activates movement of the portion of the side wall relative to the lid such that when the lid is open, the interior is accessible for providing and removing one of the tires from the interior.

16. The method of claim 1, further including:
providing the at least one tire on the tire support for supporting the at least one tire in a position so that a split rim of the at least one tire is propelled toward the at least one rigid member during an explosion of the at least one tire, the tire support being adjustable for supporting the tire above a floor of the enclosure, and for rotating the tire.

17. The method of claim 1, wherein the energy absorbing material is effective for absorbing at least 3500 kiloNewtons imparted to the energy absorbing material by debris from the explosion.

18. The method of claim 1, wherein the tire cage includes a transport engagement portion for engaging with transport equipment to transport the tire cage, the transport engagement portion including a recess engaged by the transport equipment.

19. The method of claim 1, further including positioning the energy absorbing material between a decoupler plate and the at least one rigid member, wherein the decoupler plate distributes forces from the explosion substantially uniformly across an entire area of the decoupler plate facing the explosion.

20. The method of claim 1, wherein the operator controls include a user control for locking a lid of the enclosure in an open position for providing one of the tires to the enclosure or removing one of the tires from the enclosure.

21. The method of claim 1, wherein when the one tire explodes, at least 900 kiloJoules of energy is released toward the energy absorbing material for crushing the rigid open cells, the crushing of the rigid open cells absorbs a majority of the at least 900 kiloJoules.

22. The method of claim 21, wherein the energy absorbing material is less than 2% of a total weight of the tire cage.

23. The method of claim 21, wherein the rigid open cells of the energy absorbing material have a thickness of approximately less than 20 inches.

24. The method of claim 21, wherein the at least 900 kiloJoules is closer to 1500 kiloJoules than 900 kiloJoules.

25. The method of claim 1, wherein the crushing of the rigid open cells permanently deforms the rigid open cells.

26. The method of claim 1, wherein the interior includes a pedestal for raising the tire within the interior above a floor of the interior.

* * * * *